(12) United States Patent
Beita et al.

(10) Patent No.: US 11,274,610 B2
(45) Date of Patent: Mar. 15, 2022

(54) COMBUSTION SYSTEM CONTROL

(71) Applicant: Siemens Energy Global GmbH & Co. KG, Munich (DE)

(72) Inventors: Jadeed Beita, Lincoln (GB); Andrew Dawson, Newark (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/045,809

(22) PCT Filed: Mar. 29, 2019

(86) PCT No.: PCT/EP2019/058083
§ 371 (c)(1),
(2) Date: Oct. 7, 2020

(87) PCT Pub. No.: WO2019/206566
PCT Pub. Date: Oct. 31, 2019

(65) Prior Publication Data
US 2021/0140376 A1 May 13, 2021

(30) Foreign Application Priority Data

Apr. 23, 2018 (EP) .................... 18168708

(51) Int. Cl.
*F02C 9/28* (2006.01)
*F02C 3/04* (2006.01)
(Continued)

(52) U.S. Cl.
CPC ............ *F02C 9/28* (2013.01); *F02C 3/04* (2013.01); *F02C 9/34* (2013.01); *F02C 9/50* (2013.01);
(Continued)

(58) Field of Classification Search
CPC ...... F02C 9/26; F02C 9/28; F02C 9/50; F02C 9/54; F02C 9/34; F05D 2270/082; F05D 2270/708; F23R 3/26
See application file for complete search history.

(56) References Cited

U.S. PATENT DOCUMENTS 3,975,900 A * 8/1976 Pfefferle .................. F23R 3/26
60/773
4,055,997 A * 11/1977 Kniat ....................... F02C 9/28
73/112.01

(Continued)

FOREIGN PATENT DOCUMENTS

RU 2347143 C2 2/2009
RU 2372526 C1 11/2009

OTHER PUBLICATIONS

PCT International Search Report and Written Opinion of International Searching Authority dated Jun. 25, 2019 corresponding to PCT International Application No. PCT/EP2019/058083 filed Mar. 29, 2019.

*Primary Examiner* — Alain Chau

(57) ABSTRACT

A method of controlling a combustion system of a gas turbine engine which has a combustor with a primary combustion zone, of which a condition in the primary combustion zone is defined by a primary zone control parameter. The method includes controlling the primary zone control parameter to be substantially constant value over a range of values of compressor inlet air temperature.

13 Claims, 5 Drawing Sheets

(51) Int. Cl.
  *F02C 9/34* (2006.01)
  *F02C 9/54* (2006.01)
  *F02C 9/50* (2006.01)

(52) U.S. Cl.
  CPC .......... *F02C 9/54* (2013.01); *F05D 2270/082* (2013.01); *F05D 2270/301* (2013.01); *F05D 2270/303* (2013.01); *F05D 2270/313* (2013.01); *F05D 2270/708* (2013.01)

(56) References Cited

U.S. PATENT DOCUMENTS

| | | | | |
|---|---|---|---|---|
| 4,648,242 | A * | 3/1987 | Griesinger | F02C 9/40 60/39.281 |
| 4,649,700 | A * | 3/1987 | Gardiner | F02C 9/28 60/39.281 |
| 5,537,864 | A | 7/1996 | Sood | |
| 7,007,487 | B2 | 3/2006 | Belokon et al. | |
| 7,549,292 | B2 * | 6/2009 | Peck | F02C 9/18 60/773 |
| 7,610,745 | B2 * | 11/2009 | Fujii | F02C 9/28 60/39.27 |
| 9,284,890 | B2 * | 3/2016 | Panov | F01D 17/085 |
| 9,970,360 | B2 * | 5/2018 | Marini | F02C 7/057 |
| 10,968,836 | B2 * | 4/2021 | Price | F02C 9/34 |
| 2002/0104316 | A1 | 8/2002 | Dickey et al. | |
| 2005/0109033 | A1 * | 5/2005 | Braun | F02C 9/20 60/772 |
| 2007/0074516 | A1 * | 4/2007 | Peck | F23R 3/26 60/772 |
| 2007/0079593 | A1 * | 4/2007 | Fujii | F02C 9/28 60/39.27 |
| 2009/0222187 | A1 | 9/2009 | Martling et al. | |
| 2010/0000222 | A1 | 1/2010 | Price | |
| 2010/0251727 | A1 | 10/2010 | Myers et al. | |
| 2011/0265486 | A1 * | 11/2011 | Plant | F02C 9/52 60/773 |
| 2012/0297788 | A1 * | 11/2012 | Panov | F23N 1/022 60/772 |
| 2013/0227954 | A1 * | 9/2013 | Marini | F02C 9/54 60/773 |
| 2016/0069271 | A1 * | 3/2016 | Shinkle | F23R 3/286 60/776 |
| 2016/0273457 | A1 | 9/2016 | Thorston et al. | |
| 2018/0016983 | A1 * | 1/2018 | Sonoda | F02C 7/057 |
| 2019/0234315 | A1 * | 8/2019 | Price | F02C 9/26 |

* cited by examiner

Table 1: Inlet Temperature VS Compressor | | | | TET Table for Engine Controls Implementation | |
|---|---|---|---|---|---|
| COMPRESSOR INLET TEMPERATURE ($A_1$) | $A_1$ | $A_2$ | $A_3$ | .......................... | $A_n$ |
| TET (T) | $T_1$ | $T_2$ | $T_3$ | .......................... | $T_n$ |

COMBUSTION SYSTEM CONTROL

CROSS REFERENCE TO RELATED APPLICATIONS

This application is the US National Stage of International Application No. PCT/EP2019/058083 filed 29 Mar. 2019, and claims the benefit thereof. The International Application claims the benefit of European Application No. EP18168708 filed 23 Apr. 2018. All of the applications are incorporated by reference herein in their entirety.

FIELD OF INVENTION

The present disclosure relates to a method of controlling a combustion system.

In particular the disclosure is concerned with a method of controlling a combustion system of a gas turbine engine, a control system, a gas turbine engine comprising such a control system, and a method of manufacturing a combustion system.

BACKGROUND

Gas turbine engines, which are a specific example of turbomachines, generally include, in flow series, a compressor for compression of air, a combustor for burning fuel with at least some of the compressed air, and a turbine for extracting energy from the resultant accelerated combustion product.

Many gas turbines currently operate on the philosophy of a 'flat' (Constant) Actual Turbine Entry Temperature (TET) rating line over the range of compressor inlet temperature conditions it is designed for. Hence, as shown in FIG. 1, as compressor inlet temperature varies, the Turbine Entry Temperature is kept constant. However, combustor inlet variables of pressure, temperature and fuel-air ratio vary with changes in compressor inlet conditions. The result is that while TET remains constant, primary zone temperature within a primary zone of the combustor, which dictates formation rates of Oxides of Nitrogen (NOx), Carbon Monoxide (CO) and Unburnt Hydrocarbons (UHC) pollutants, varies as compressor inlet conditions change. Consequently, emissions from such gas turbine engines vary as compressor inlet (e.g. ambient atmosphere) conditions vary. Hence NOx emissions will vary from high values at lower compressor inlet temperatures to low values at higher compressor inlet temperatures. Conversely CO and UHC emissions will be lowest at the lower compressor inlet temperatures and highest at the higher compressor inlet temperatures.

Hence a system which can be configured to better control variances in combustion conditions to thereby control emissions is highly desirable.

SUMMARY

According to the present disclosure there is provided apparatus, a system and methods as set forth in the appended claims. Other features of the invention will be apparent from the dependent claims, and the description which follows.

Accordingly there may be provided a method of controlling a combustion system of a gas turbine engine (10). The gas turbine engine (10) may have a compressor section (14) with an inlet (12) and a combustor (28) with a primary combustion zone (110), of which a condition in the primary combustion zone (110) is defined by a primary zone control parameter. The engine may further comprise a turbine section (18) having an inlet region (44). The method may comprise: controlling the primary zone control parameter (PZCP) to be substantially constant value over a range of values of compressor inlet air temperature (T1).

This provides an advantageous method of control which, over the compressor inlet condition operating range of the engine to which an arrangement of the present disclosure is applied, emissions of NOx, CO and UHC will be consistent and hence easier to optimise.

The primary zone control parameter (PZCP) may be one of: primary zone temperature (Tpz) or primary zone equivalence ratio (Epz). These parameters are of particular importance as they directly relate to the combustion process.

The method may further comprise the step of: determining turbine entry temperature (TET) at the turbine inlet (44) as a function of compressor inlet temperature T1 for a predetermined value of the primary zone control parameter (PZCP), and controlling one or more engine operating parameters to a value, or range of values, determined as a function of compressor inlet air temperature (T1) and/or temperature at turbine entry (TET); so that actual primary zone control parameter (PZCP) in the combustor (28) is controlled to be substantially equal to the predetermined value of the primary zone control parameter (PZCP); and so the determined turbine entry temperature (TET) is within a predetermined range of values. This step is advantageous because it provides further control over the generation of emissions.

The determined turbine entry temperature (TET) may be determined from a predetermined relationship which correlates a range of compressor inlet air temperature (T1) values to a range of turbine entry temperature (TET) values for a predetermined constant value of primary zone control parameter (PZCP), wherein the relationship may be defined by a:
- a look up table, including interpolation between data points in the look up table;
- an equation; and/or
- a best fit relationship of a series of values of compressor inlet air temperature (T1) and turbine entry temperature (TET).

The relationship, however it may be expressed, provides the advantage of ensuring the turbine exit temperature does not drop below a value below which the turbine performance is compromised, or exceed a predetermined value where the turbine may be damaged.

The engine operating parameter(s) may be chosen from a list comprising:
- compressor intake air flow (EOP1);
- compressor delivery air pressure (EOP2);
- compressor delivery temperature (EOP3);
- fuel mass flowrate into combustor (EOP4); and/or
- combustor air fuel ratio (EOP5).

The actual primary zone control parameter (PZCP) may be controlled to have a substantially constant value at a predetermined value, or range values, of engine power conditions. This is advantageous because it provides further control over the generation of emissions.

The predetermined engine power condition value may be substantially 100%. To control emissions at this engine rating is beneficial as this is the condition which engines tend to operate for longest to achieve maximum efficiency.

The predetermined engine power condition may be less than 100%. The compressor intake air flow (EOP1) may be less than 100% of maximum compressor intake flow. Alternatively compressor air flow (EOP1) may be reduced after intake prior to delivery to the combustor. These settings may be required if a lower power output from the engine is required.

The method may comprise the step of measuring, inferring and/or calculating compressor inlet air temperature (T1).

There may also be provided a control system (100) for a combustion system of a gas turbine engine operable to work the method of the present disclosure. The control system may comprise a controller and any one or more sensors (61-68).

The controller may be programmed to determine from a predetermined relationship which correlates a range of compressor inlet air temperature (T1) values to a range of turbine entry temperature (TET) values for a predetermined constant value of primary zone control parameter (PZCP), wherein the relationship is defined by a: a look up table, including interpolation between data points in the look up table; an equation; and/or a best fit relationship of a series of values of compressor inlet air temperature (T1) and turbine entry temperature (TET).

There may also be provided a gas turbine engine (10) controlled according to the method of the present disclosure. The gas turbine engine having a compressor section with an inlet; a combustor with a primary combustion zone, a turbine section having an inlet region and a control system, the control system comprising a controller and any one or more sensors.

The controller that may be programmed to determine from a predetermined relationship which correlates a range of compressor inlet air temperature (T1) values to a range of turbine entry temperature (TET) values for a predetermined constant value of primary zone control parameter (PZCP), wherein the relationship is defined by a: a look up table, including interpolation between data points in the look up table; an equation; and/or a best fit relationship of a series of values of compressor inlet air temperature (T1) and turbine entry temperature (TET).

There may also be provided a method of manufacturing a control system (100) for a combustion system of a gas turbine engine (10). The gas turbine engine (10) may have: a compressor section (14) with an inlet (12); a combustor (28) with a primary combustion zone (110), of which a condition in the primary zone is defined by a primary zone parameter. The engine 10 may further comprise a turbine section (18) having an inlet (entry) region (44). The method may comprise the steps of: determining a desired value of a primary zone control parameter (PZCP) for optimal control of NOx, CO and/or UHC; determining a range of values of turbine entry temperature (TET) at the turbine inlet (44) as a function of a range of compressor inlet temperatures (T1) for the predetermined value of primary zone control parameter (PZCP); configuring the combustor (28) and/or control system (100) so as to: control actual primary zone control parameter (PZCP) over the range of values of compressor inlet air temperature (T1): so that actual primary zone control parameter (PZCP) is controlled to be substantially equal to the predetermined value of primary zone control parameter (PZCP); and so the determined turbine entry temperature (TET) is within the predetermined range of values.

This provides an advantageous method of creating a system which, over the compressor inlet condition operating range of the engine to which an arrangement of the present disclosure is applied, emissions of NOx, CO and UHC will be consistent and hence easier to optimise.

The primary zone control parameter (PZCP) may be one of: primary zone temperature (Tpz) or primary equivalence ratio (Epz). These parameters are of particular importance as they directly relate to the combustion process.

Hence there may be provided a method, system and apparatus for control of NOx, CO and UHC emissions from a combustor of a gas turbine engine.

BRIEF DESCRIPTION OF THE DRAWINGS

Examples of the present disclosure will now be described with reference to the accompanying drawings, in which.

DETAILED DESCRIPTION

Figure 1:
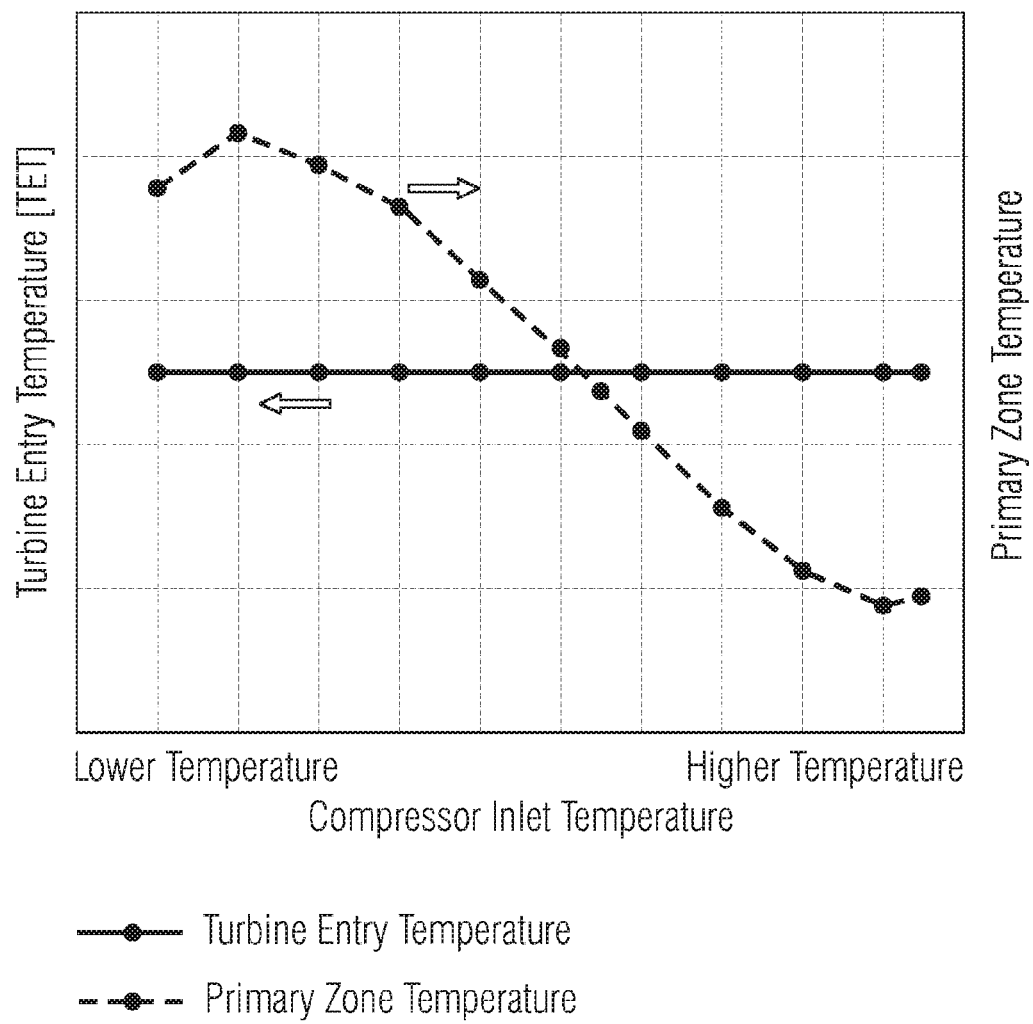
FIG. 1 shows a figure which describes the operation of a known system.
Figure 2:
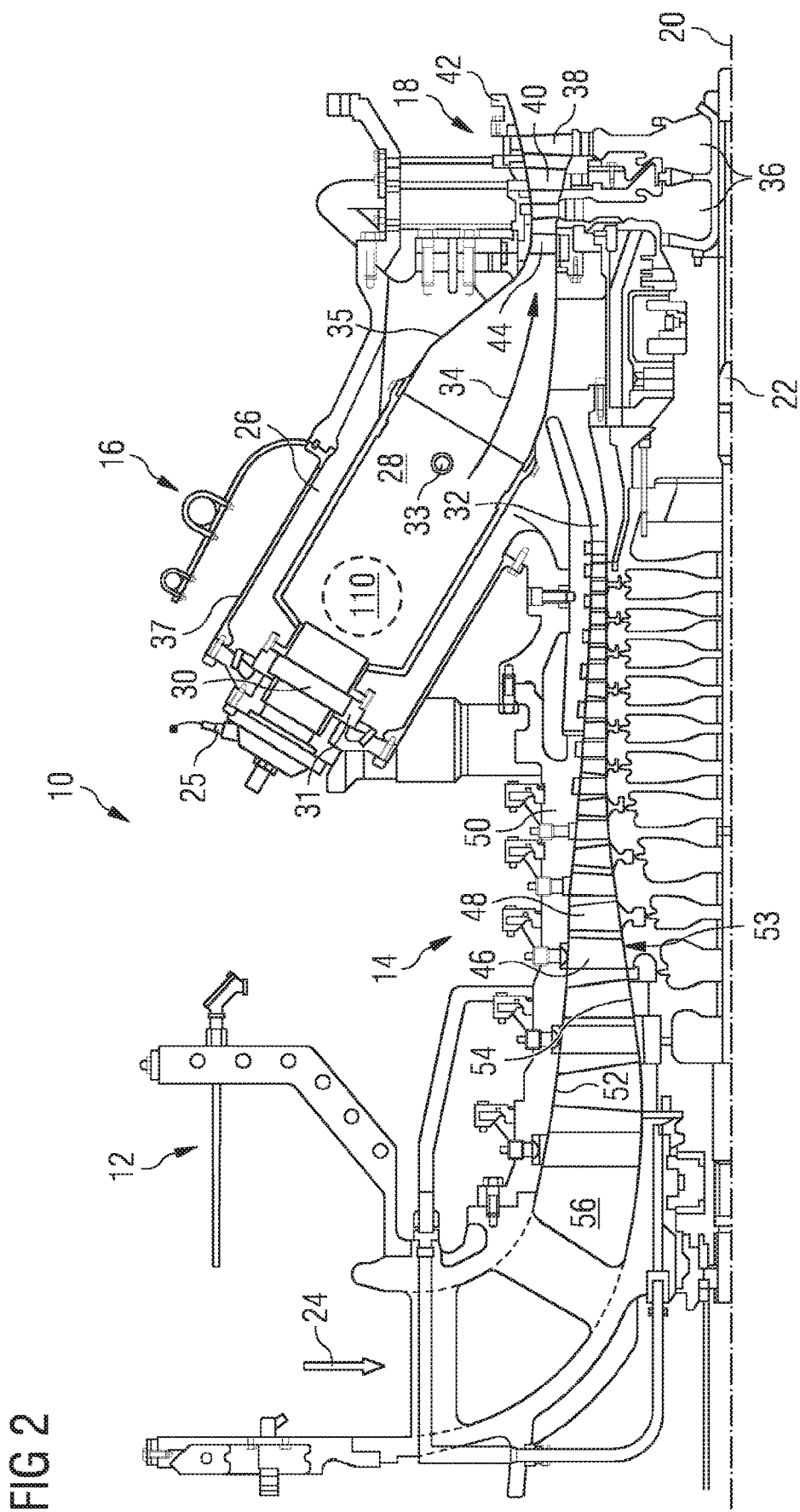
FIG. 2 is a cross-sectional view of a gas turbine engine to which a system of the present disclosure may be applied.

FIG. 2 shows an example of a gas turbine engine 10 in a sectional view which may be provided with a control system of the present disclosure, and hence be controlled by the method of the present disclosure. The gas turbine engine 10 may also comprise a control system manufactured, configured and/or designed by a method according to the present disclosure.

The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28.

The combustion chambers 28 and the burners 30 are located inside the burner plenum 26 defined by a casing 37 which surrounds the or each combustion chamber 28. The compressed air passing through the compressor 14 enters a diffuser 32 and is discharged from the diffuser 32 into the burner plenum 26 from where a portion of the air enters the burner 30 and/or passes through an air swirler 31 and is mixed with a gaseous or liquid fuel. The air/fuel mixture is then burned initially in a primary combustion zone 110. The combustion process proceeds as the working gas from the combustion is channeled through the combustion chamber 28 to the turbine section 18 via a transition duct 35. Air may also enter the combustion chamber 28 through a dilution hole 33 in a wall of the combustion chamber 28 downstream of the primary combustion zone 110 in order to promote complete combustion before the working gas exits the combustion chamber 28.

The turbine section 18 comprises a number of blade carrying discs 36 attached to the shaft 22. In addition, guiding vanes 40, which are fixed to a stator 42 of the gas turbine engine 10, are disposed between the stages of annular arrays of turbine blades 38. Between the exit of the combustion chamber 28 and the leading turbine blades 38, inlet guiding vanes 44 (i.e. to provide an inlet) are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

Figure 3:
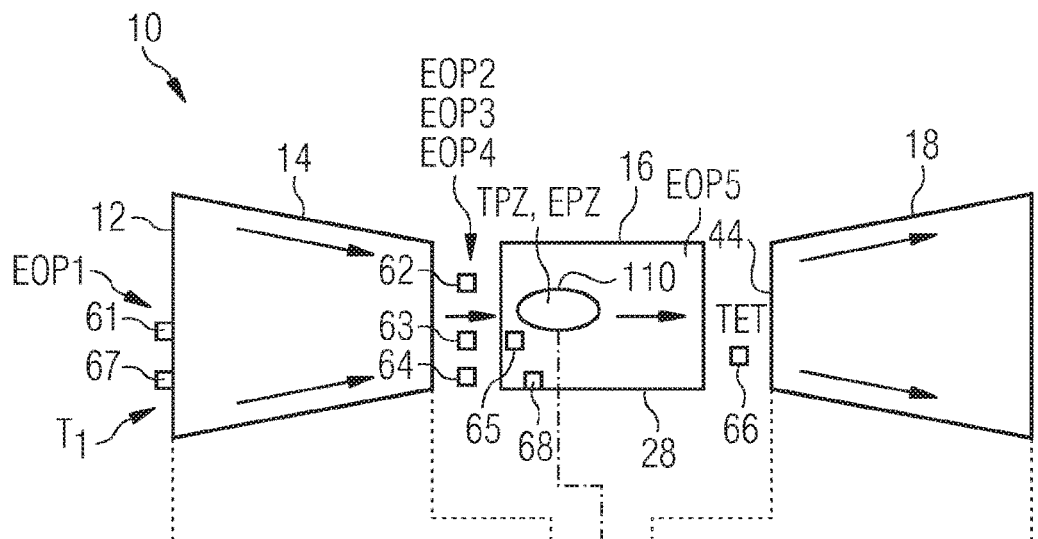
FIG. 3 shows a diagrammatic representation of the system of the present disclosure.

FIG. 3 shows a more schematic representation of the system shown in FIG. 2. For clarity less technical detail is included, although like features (compressor 14, combustion section 16 and turbine 18) are identified with the same reference numerals. Various regions are indicated where temperatures and pressures, such as compressor inlet temperature T1 and turbine exit temperature TET, all of which are terms of the art and will be referred to in more detail below. Also shown in FIG. 3 is a controller 100 (i.e. a control system), operable to receive signals which indicate, or are processed to determine, system operating conditions. As will be described the controller is also operable to control engine operating parameters.

During operation of the gas turbine engine, a condition in the primary combustion zone 110 is defined by a primary zone control parameter (PZCP). The primary zone control parameter (PZCP) may be one of primary zone temperature (Tpz) or primary zone equivalence ratio (Epz), which is measured or calculated based on readings from a sensor 68. For the avoidance of doubt, Equivalence ratio is the ratio of "actual fuel/air ratio" to "stoichiometric fuel/air ratio". Also, as understood in the art, stoichiometric combustion occurs when all the oxygen is consumed in the reaction. Hence the primary zone equivalence ratio may be a parameter used to determine primary zone temperature, as required.

The controller 100 is operable and configured to control the primary zone control parameter (PZCP) to be a substantially constant value over a range of values of compressor inlet air temperature T1 (i.e. air temperature at the inlet 12 of the compressor 14). This is achieved by the controller 100 receiving signals corresponding to measurements of a number of engine operating parameters in order to monitor conditions, and where possible and required, controlling at least one of the engine operating parameters to thereby control the primary zone control parameter (PZCP) to a predetermined value for a given compressor air inlet temperature T1.

The method may comprise the step of measuring, inferring and/or calculating compressor inlet air temperature (T1) via a sensor 67 located at or near to the compressor inlet 12.

The method of operation executed by the controller 100 comprises the steps of determining turbine entry temperature TET at the turbine inlet 44 as a function of compressor inlet temperature T1 for a predetermined (i.e. desired) value of the primary zone control parameter PZCP, and controlling one or more engine operating parameters to a value, or range of values determined as a function of compressor inlet air temperature T1 and/or temperature at turbine entry TET. The turbine entry temperature is measured by a sensor 66 located at or near to the entry to the turbine section 18.

The engine operating parameter(s), shown in FIG. 3, may be chosen from a list comprising: a) compressor intake air flow (EOP1) by volume and/or mass (measured at compressor inlet 12 via sensor 61); b) compressor delivery air pressure (EOP2) (measured at exit from the compressor 14 prior to delivery to the combustor 16 via sensor 62); c) compressor delivery temperature (EOP3) (measured at exit from the compressor 14 prior to delivery to the combustor 16 via sensor 63); d) fuel mass flowrate into combustor (EOP4) (e.g. total mass flow rate of fuel delivered to the combustor via sensor 64); and/or e) combustor air fuel ratio (EOP5) measured by sensor 65.

The control system 100 comprises the controller 100, as described herein, and one or more of the sensors referenced 61-68.

The controller is operable such that in controlling the or each engine operating parameter, the actual primary zone control parameter PZCP in the combustor 28 is controlled to be substantially equal to the predetermined value of the primary zone control parameter (PZCP). That is to say, one or more engine operating parameters are controlled so that conditions in the primary zone of the combustor match the desired/predetermined conditions which enable the primary zone control parameter (PZCP) to be maintained at a substantially constant value over a range of values of compressor inlet air temperature (T1) values.

Also, in controlling the or each engine operating parameter, the determined turbine entry temperature (TET) is maintained within a predetermined (i.e. desired) range of values.

Figure 5:
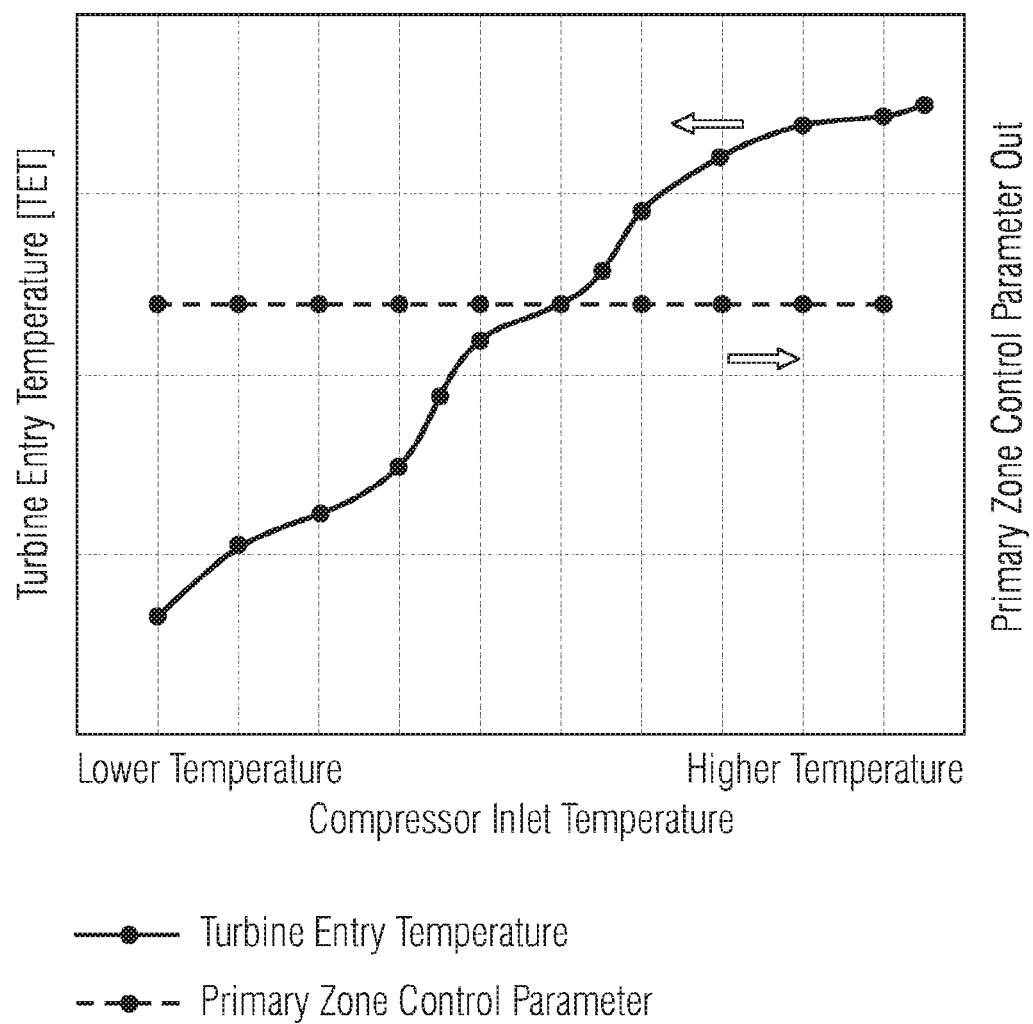
FIG. 5 shows a figure which describes the operation of the system of the present disclosure.

That is to say, the primary zone parameter is controlled to be constant, which consequentially means there is a variable TET across the compressor inlet temperature range, as illustrated in FIG. 5. Hence the primary zone temperature (Tpz) may be maintained at a substantially constant value, and/or or the primary zone equivalence ratio (Epz) may be maintained at a substantially constant value.

Operating the combustion system, and engine generally, in this way means that emissions produced will be constant over a range of engine operating conditions since combustion conditions are substantially constant, and hence the products of combustion will be produced at a substantially constant rate in substantially constant concentrations.

The determined turbine entry temperature (TET) is determined from a predetermined relationship (shown as "120" in the controller 100 in FIG. 3) which correlates a range of compressor inlet air temperature (T1) values to a range of turbine entry temperature (TET) values for a predetermined constant value of primary zone control parameter (PZCP), wherein the relationship may be defined by a: a) a look up table, including interpolation between data points in the look up table; b) an equation; and/or c) a best fit relationship of a series of values of compressor inlet air temperature (T1) and turbine entry temperature (TET).

The look up table may comprise a predefined table of TET and compressor inlet temperature T1 values, derived from engine performance modelling at full load and part load where VGV modulation and/or B2E is used for emissions control.

By way of non-limiting example, such a look up table is illustrated in Table 1 in FIG. 3 where A1 and T1 respectively represent the coldest compressor inlet temperature and corresponding TET the engine can operate at while An and Tn respectively represent the highest compressor inlet temperature and corresponding TET the engine can operate at.

Between A1 and An, the table can assume any number of columns suitable for/limited by the engine controls system. Intermediate values of Ai and Ti between consecutive table columns are derived through interpolation of adjacent columns or through a curve fit.

The equation and best fit relationship may be provided as a curve fit which represents the mathematical function that best describes the TET vs compressor inlet temperature relationship. The control system will determine the operating TET for the engine from this mathematical function at every ambient temperature condition.

The controller is operable to control the actual primary zone control parameter (PZCP) so as to have a substantially constant value at a predetermined value, or range values, of engine power conditions.

The predetermined engine power condition value may be substantially 100% (i.e. full power/engine speed).

Alternatively or additionally the predetermined engine power condition may be less than 100%. This may be because compressor intake air flow (EOP1) is less than 100% of maximum compressor intake flow (for example because variable guide vanes at compressor inlet are partially "closed", and/or modulated vary and restrict intake air flow). Alternatively it may be achieved by reducing compressor air flow (EOP1) after intake (i.e. inlet to the compressor) but prior to delivery to the combustor. This may be achieved by bleeding air flow from the compressor.

Figure 4:
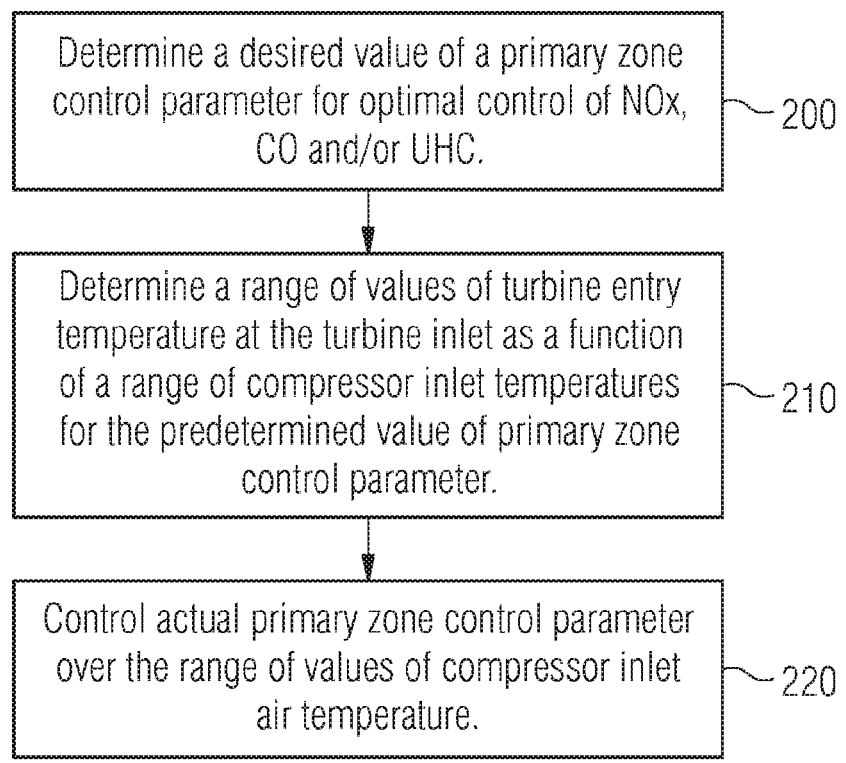
FIG. 4 shows a flow diagram setting out how the system of the present disclosure may be designed.

The control system 100 for the combustion system of a gas turbine 10 described above may be made (i.e. including the step of designing and configuring) in the following way, and as shown in FIG. 4.

A first step 200 comprises the step of determining a desired value of a primary zone control parameter (PZCP) for optimal control of NOx, CO and/or UHC emission concentrations. By way of non-limiting example, the desired value of emission concentrations may be in the range of 9 to 25 part per million on a volumetric and dry basis (9 to 25 ppmvd). Alternatively, the desired value of emission concentrations may be less than 9 ppmvd).

A second step 210 comprises determining a range of values of turbine entry temperature (TET) at the turbine inlet 44 as a function of a range of compressor inlet temperatures (T1) for the predetermined (i.e. desired) value of primary zone control parameter (PZCP).

A third step 220 comprises the step of configuring the combustor 28 and/or control system 100 so as to control actual primary zone control parameter (PZCP) over the range of values of compressor inlet air temperature (T1). As set out above, the primary zone control parameter (PZCP) may be one of: primary zone temperature (Tpz) or primary equivalence ratio (Epz).

Hence features of the combustor (i.e. combustion chamber 28) may be configured in order to allow for improved control of the primary zone control parameter PZCP. For example, with reference to FIG. 2, the geometry of at least one of the combustion chamber 28 (e.g. diameter, length, dilution hole position and/or size), the combustion casing 37 which defines an air flow passage there between (e.g. burner plenum 26), the air swirler at entry to the combustion system (e.g. air swirler 31) and transition duct 35 may be configured/designed so that air flow split between the swirler, combustion chamber and transition duct is distributed to achieve the desired primary zone temperature.

In this way there is created a system in which the actual primary zone control parameter (PZCP) is controlled to be substantially equal to the predetermined value of primary zone control parameter (PZCP). Also the determined turbine entry temperature (TET) is controlled to be within the predetermined range of values. That is to say, system is designed to that the primary zone parameter is controlled to be constant, which consequentially means there is a variable TET across the compressor inlet temperature range, as illustrated in FIG. 5.

Hence the system ensures emissions of NOx, CO and UHC are kept substantially constant as compressor inlet conditions vary because conditions in the combustor, and particularly the primary zone 110 of the combustor, are kept constant by virtue of design of the combustor and/or configuration of the controller 100.

Through maintaining constant conditions in the combustion system, the method, system and apparatus of the present disclosure will aid in monitoring and stabilising physico-chemical processes within the combustion system through improved predictability of heat transfer to liner walls, heat release rates, mixing processes, temperature traverse etc. This allows for informed design choices for enhanced wall cooling, damping of thermoacoustic oscillations, turbine cooling, etc.

Thus the method, system and apparatus of the present disclosure is primarily advantageous because over the compressor inlet condition operating range (i.e. inlet temperature) of the engine to which an arrangement of the present disclosure is applied, emissions of NOx, CO and UHC will be consistent and easier to control and, where required, may be processed, filtered or captured. This will eliminate the risk of higher emissions above prescribed/desired limits, especially at the compressor inlet temperature extremes, providing an environmental advantage as well as a technical and commercial benefit.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a combustion system of a gas turbine engine, the gas turbine engine having: a compressor section with an inlet; a combustor with a primary combustion zone, of which a condition in the primary combustion zone is defined by a primary zone control parameter; a turbine section having an inlet region; the method comprising:
   controlling the primary zone control parameter to have a substantially constant value over a range of values of compressor inlet air temperature, the range of values of compressor inlet air temperature based on ambient temperature variation,
   determining a turbine entry temperature at the turbine inlet as a function of compressor inlet temperature for a predetermined value of the primary zone control parameter, and controlling one or more engine operating parameters to a value, or range of values, determined as a function of compressor inlet air temperature and/or turbine entry temperature; wherein the primary zone control parameter in the combustor is controlled to be substantially equal to the predetermined value of the primary zone control parameter; and wherein the determined turbine entry temperature is within a predetermined range of turbine entry temperature values.

2. The method as claimed in claim 1,
wherein the primary zone control parameter is one of: a primary zone temperature or a primary zone equivalence ratio.

3. The method as claimed in claim 1,
wherein the determined turbine entry temperature is determined from a predetermined relationship which correlates the range of compressor inlet air temperature values to the range of turbine entry temperature values for a predetermined constant value of the primary zone control parameter, wherein the relationship is defined by a:
a look up table, including interpolation between data points in the look up table; an equation; and/or
a best fit relationship of a series of values of compressor inlet air temperature and turbine entry temperature.

4. The method as claimed in claim 1, wherein the engine operating parameter(s) is/are chosen from a list comprising: compressor intake air flow; compressor delivery air pressure; compressor delivery temperature; fuel mass flow rate into combustor; and/or combustor air fuel ratio.

5. The method as claimed in claim 1,
wherein the primary zone control parameter is controlled to have a substantially constant value at a predetermined engine power condition value, or range of values.

6. The method as claimed in claim 5, wherein the predetermined engine power condition value is substantially 100%.

7. The method as claimed in claim 5,
wherein the predetermined engine power condition is less than 100% and
wherein a compressor intake air flow is less than 100% of maximum compressor intake flow; or
wherein the compressor intake air flow is reduced after intake prior to delivery to the combustor.

8. The method as claimed in claim 1, further comprising: measuring, inferring and/or calculating compressor inlet air temperature.

9. A control system for a combustion system of a gas turbine engine comprising:
a controller, and
one or more sensors,
wherein the control system is configured to implement the method of claim 1.

10. A control system for a combustion system of a gas turbine engine comprising:
a controller, and
one or more sensors, wherein the control system is configured to implement the method of claim 1,
wherein the controller is programmed to determine from a predetermined relationship which correlates the range of compressor inlet air temperature values to the range of turbine entry temperature values for a predetermined constant value of the primary zone control parameter, wherein the relationship is defined by a:
a look up table, including interpolation between data points in the look up table; an equation; and/or a best fit relationship of a series of values of compressor inlet air temperature and turbine entry temperature.

11. A gas turbine engine, comprising: a compressor section with an inlet;
a combustor with a primary combustion zone, a turbine section having an inlet region, and a control system, the control system comprising a controller and one or more sensors,
wherein the control system is configured to implement the method of claim 1,
wherein the controller is programmed to determine from a predetermined relationship which correlates the range of compressor inlet air temperature values to the range of turbine entry temperature values for a predetermined constant value of the primary zone control parameter, wherein the relationship is defined by a:
a look up table, including interpolation between data points in the look up table; an equation; and/or
a best fit relationship of a series of values of compressor inlet air temperature and turbine entry temperature.

12. A method of manufacturing a control system for a combustion system of a gas turbine, the gas turbine having: a compressor section with an inlet; a combustor with a primary combustion zone, of which a condition in the primary combustion zone is defined by a primary zone control parameter; and a turbine section having an inlet region; the method comprising:
determining a value of the primary zone control parameter for optimal control of NOx, CO and/or UHC;
determining a range of values of turbine entry temperature at the turbine inlet as a function of a range of compressor inlet temperatures for a predetermined value of primary zone control parameter, the range of compressor inlet air temperatures based on ambient temperature variation;
configuring the combustor and/or control system so as to:
control the primary zone control parameter over the range of compressor inlet air temperatures:
wherein the primary zone control parameter is controlled to be substantially equal to the determined value of the primary zone control parameter; and
wherein the turbine entry temperature is within the predetermined range of values for the turbine entry temperature.

13. The method as claimed in claim 12,
wherein the primary zone control parameter is one of: a primary zone temperature or a primary equivalence ratio.

* * * * *